US010745123B2

(12) United States Patent
Trantham et al.

(10) Patent No.: US 10,745,123 B2
(45) Date of Patent: Aug. 18, 2020

(54) ROTORCRAFT SWASHPLATE ACTUATOR CONTROL

(71) Applicant: Textron Innovations Inc., Providence, RI (US)

(72) Inventors: Michael Trantham, Arlington, TX (US); Brady G. Atkins, Euless, TX (US); Charles Eric Covington, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 210 days.

(21) Appl. No.: 15/942,420

(22) Filed: Mar. 30, 2018

(65) Prior Publication Data

US 2019/0300169 A1 Oct. 3, 2019

(51) Int. Cl.
*B64C 27/605* (2006.01)
*B64C 27/04* (2006.01)
(Continued)

(52) U.S. Cl.
CPC ........... *B64C 27/605* (2013.01); *B64C 27/04* (2013.01); *B64C 27/28* (2013.01); *B64C 27/82* (2013.01);
(Continued)

(58) Field of Classification Search
CPC .... B64C 27/28; B64C 27/605; B64C 29/0033
See application file for complete search history.

(56) References Cited

U.S. PATENT DOCUMENTS 4,362,085 A * 12/1982 Venuti, Jr. ............. B64C 27/605
416/114
4,376,979 A * 3/1983 Fowler ..................... B64C 27/54
244/17.13
(Continued)

FOREIGN PATENT DOCUMENTS

CA 3011439 A1 7/2017
EP 2778061 A1 9/2014
WO 2017123987 A1 7/2017

OTHER PUBLICATIONS

McManus, B. V-22 Tiltrotor Fly-by-Wire Flight Control System. Eleventh European Rotorcraft Forum, 1985. accessed from https://dspace-erf.nlr.nl/xmlui/bitstream/handle/20.500.11881/3039/ERF%201985-57.pdf?sequence=1 (Year: 1985).*

(Continued)

*Primary Examiner* — Michael Lebentritt
*Assistant Examiner* — Topaz L. Elliott
(74) *Attorney, Agent, or Firm* — Slater Matsil, LLP

(57) ABSTRACT

A rotorcraft includes a flight control computer (FCC), a first rotor system, and a second rotor system. The first rotor system includes a first swashplate coupled to a first rotor and a first multiple actuators configured to move the first swashplate. The second rotor system includes a second swashplate coupled to a second rotor and a second multiple actuators configured to move the second swashplate. The rotorcraft also includes a first communications channel coupled between the FCC, a first actuator of the first multiple actuators, and a second actuator of the second multiple actuators. The rotorcraft also includes a second communications channel coupled between the FCC and a third actuator of the first multiple actuators.

20 Claims, 8 Drawing Sheets

(51) Int. Cl.
*B64C 27/82* (2006.01)
*B64C 27/28* (2006.01)
*B64C 29/00* (2006.01)
*B64C 13/50* (2006.01)

(52) U.S. Cl.
CPC ........ *B64C 29/0033* (2013.01); *B64C 13/503* (2013.01)

(56) References Cited

U.S. PATENT DOCUMENTS

| | | | | |
|---|---|---|---|---|
| 4,420,808 | A * | 12/1983 | Diamond | B64C 27/56 701/4 |
| 5,765,783 | A * | 6/1998 | Albion | B64C 29/02 244/17.23 |
| 8,070,091 | B2 * | 12/2011 | Benson | B64C 27/605 244/17.13 |
| 9,156,547 | B2 * | 10/2015 | Dickman | B64C 27/605 |
| 2014/0172203 | A1 * | 6/2014 | White | B64C 13/02 701/4 |
| 2014/0263854 | A1 * | 9/2014 | Ross | B64C 29/0033 244/7 A |
| 2014/0297067 | A1 * | 10/2014 | Malay | G01C 9/005 701/4 |
| 2015/0274290 | A1 | 10/2015 | Fenny et al. | |
| 2016/0325830 | A1 * | 11/2016 | Waltner | G05D 1/0072 |
| 2017/0057629 | A1 * | 3/2017 | Halcom | B64C 27/605 |
| 2019/0016443 | A1 * | 1/2019 | Alfred | B64C 13/503 |
| 2019/0063574 | A1 * | 2/2019 | Kopp | F16H 1/28 |
| 2019/0168866 | A1 * | 6/2019 | Tovkach | B64C 27/08 |

OTHER PUBLICATIONS

Dailey, John, "Report of the Panel to Review the V-22 Program," Apr. 30, 2001, 169 pages.

Amos, James, "V-22 Osprey Guidebook 2011/2012,", May 31, 2012, 38 pages.

Gunnarsson, Dan, "Safety-Critical Communication in Avionics", Department of Automatic Control Lund University, ISSN 0280-5316 ISRN LUTFD2/TFRT-5782-SE, Dec. 1, 2006, 63 pages.

MOOG: "MOOG Newsletter Special Edition Farnborough International Airshow 2012," Jul. 9-15, 2012, 20 pages.

Sghairi, M., et al., "Challenges in Building Fault-Tolerant Flight Control System for a Civil Aircraft," IAENG International Journal of Computer Science, 35:4, IJCZ_35_4_07, Nov. 20, 2008, 5 pages.

* cited by examiner

ROTORCRAFT SWASHPLATE ACTUATOR CONTROL

TECHNICAL FIELD

The present invention generally relates to a system and method for controlling swashplate actuators in a rotorcraft, and, in particular embodiments, to a system and method for providing, in a rotorcraft including multiple rotor systems, control of the swashplate actuators of each of the rotor systems.

BACKGROUND

A tiltrotor aircraft may include two or more rotor systems that can be rotated between an airplane mode and a helicopter mode. In the helicopter mode, the rotational axes of the rotor systems are in an approximately vertical position to generate aerodynamic lift to support the weight of the tiltrotor aircraft in flight and to generate thrust to move the tiltrotor aircraft in forward flight. In the airplane mode, the rotational axes of the rotor systems are in an approximately horizontal position so that the tiltrotor aircraft behaves similar to a fixed-wing aircraft. The rotor systems may be controlled by a control system to stabilize the tiltrotor aircraft and reduce workload by assisting the pilot.

SUMMARY

A representative aspect includes a rotorcraft that includes a flight control computer (FCC) and a first rotor system. The first rotor system includes a first swashplate coupled to a first rotor and a first multiple actuators configured to move the first swashplate. The rotorcraft also includes a second rotor system that includes a second swashplate coupled to a second rotor and a second multiple actuators configured to move the second swashplate. The rotorcraft also includes a first communications channel coupled between the FCC, a first actuator of the first multiple actuators, and a second actuator of the second multiple actuators. The rotorcraft also includes a second communications channel coupled between the FCC and a third actuator of the first multiple actuators.

Another representative aspect includes an actuator control system (ACS) for a rotorcraft. The ACS includes a first set of wiring configured to communicate signals between a flight control computer (FCC), a first multiple actuators, and a second multiple actuators, wherein at least one of the first multiple actuators is part of a first rotor system, and at least one of the second multiple actuators is part of a second rotor system, the second rotor system different than the first rotor system. The ACS also includes a second set of wiring configured to communicate signals between the FCC, a third multiple actuators, and a fourth multiple actuators, wherein at least one of the third multiple actuators is part of the first rotor system, and at least one of the fourth multiple actuators is part of the second rotor system.

Yet another representative aspect relates to a method that includes transmitting signals from a first flight control computer (FCC) to one or more first rotor actuators, the one or more first rotor actuators coupled to a first rotor system via a first channel, the first channel communicatively coupled between the first FCC and the one or more first rotor actuators. The method also includes transmitting signals from the first FCC to one or more second rotor actuators, the one or more second rotor actuators coupled to a second rotor system via the first channel, the first channel communicatively coupled between the FCC and the one or more second rotor actuators. The method also includes transmitting signals from the first FCC to one or more third rotor actuators, the one or more third rotor actuators coupled to the first rotor system via a second channel, the second channel communicatively coupled between the first FCC and the one or more third rotor actuators, the one or more third rotor actuators being different than the one or more first rotor actuators.

BRIEF DESCRIPTION OF THE DRAWINGS

For a more complete understanding of the present invention, and advantages thereof, reference is now made to the following descriptions taken in conjunction with the accompanying drawings, in which.

DETAILED DESCRIPTION OF ILLUSTRATIVE EMBODIMENTS

Figure 1A:
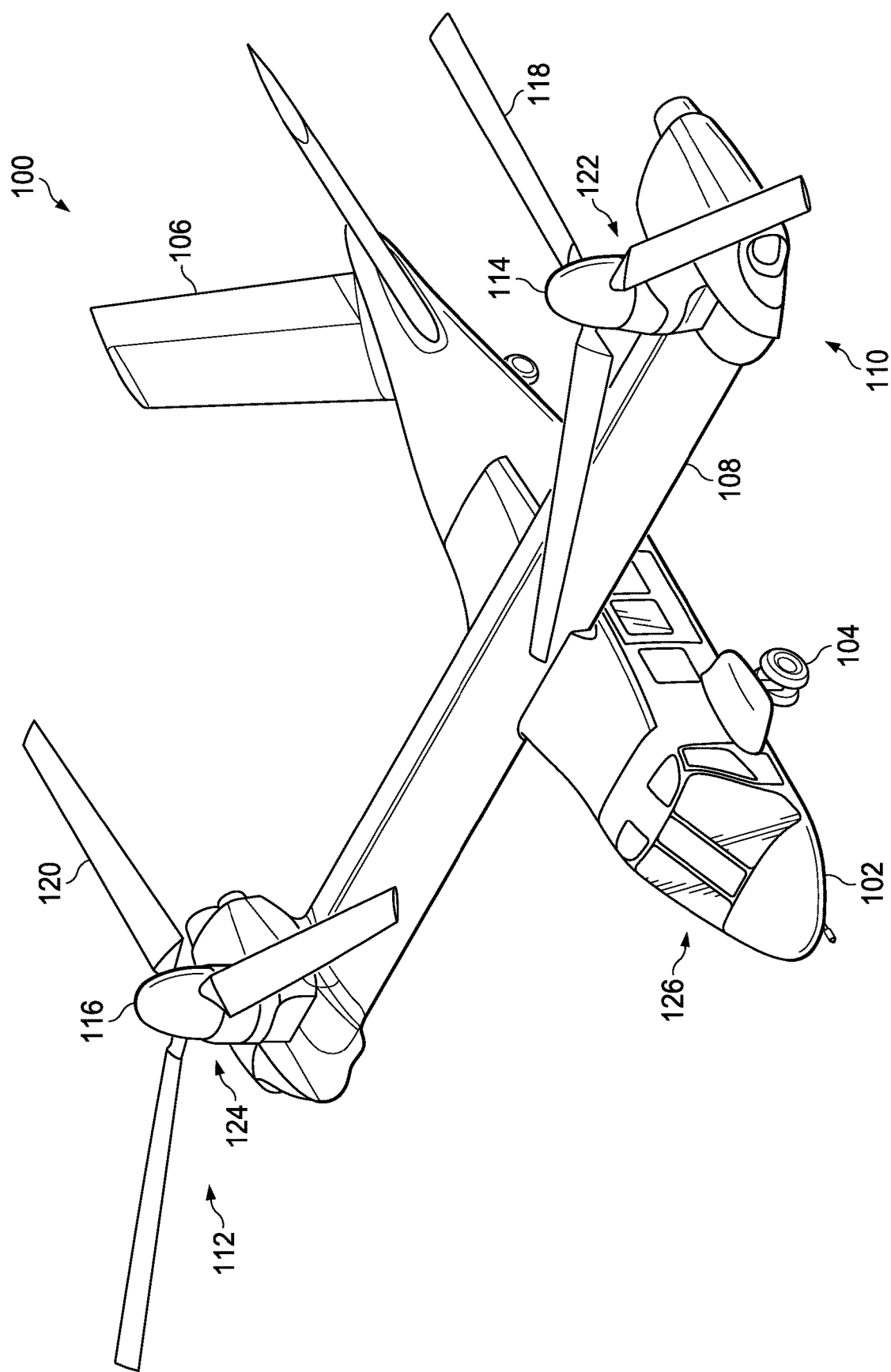
FIG. 1A representatively illustrates a tiltrotor aircraft in a grounded helicopter mode, in accordance with an embodiment.

Representative embodiments of systems and methods of the present disclosure are described below. In the interest of clarity, features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to spatial relationships between various components and to spatial orientation of various aspects or components of devices illustrated in the attached drawings. However, as will be recognized by those skilled in the art, the devices, members, apparatuses, etc., described herein may be positioned in any desired orientation. Thus, the use of terms such as "above," "below," "upper," "lower," or other contextually similar terms to describe a spatial relationship between various components, or to describe spatial orientation of aspects of such components, should be understood to describe a relative relationship between the components, or a spatial orientation of aspects of such components, respectively, as devices described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, flight characteristics of a rotorcraft at cruising speed or high speed may be significantly different than flight characteristics at hover or at relatively low speeds. Additionally, different flight control inputs for different axes of the main rotor or rotors, such as cyclic inputs or collective inputs, affect other flight controls or flight characteristics of the rotorcraft.

Recently, fly-by-wire (FBW) systems have been introduced in rotorcraft to assist pilots in stably flying rotorcraft and to reduce workload on the pilots. The FBW system may provide different control characteristics or responses for cyclic, pedal, or collective control input in different flight regimes, and may provide stability assistance or enhancement by decoupling physical flight characteristics so that pilot workload is reduced. FBW systems may be implemented in one or more flight control computers (FCCs) disposed between pilot controls and flight control systems, providing corrections or modifications to flight controls that assist in operating the rotorcraft more efficiently, or that put the rotorcraft into a stable flight mode while still allowing the pilot to override the FBW control inputs. The FBW systems in a rotorcraft may, for example, automatically adjust power output by an engine to match a collective control input, apply collective or power modification during a cyclic control input, provide automation of one or more flight control procedures, provide for default or suggested control positioning, or the like.

FBW systems for rotorcraft provide stable flight characteristics for FBW controlled flight parameters while permitting the pilot to override or work with any flight parameters suggested by the FBW system. Additionally, in providing enhanced control and automated functionality for rotorcraft flight, the FBW may be configured to maintain an intuitive and easy to use flight control system for the pilot. Thus, the FBW system adjusts the pilot flight controls so that the controls are in a position associated with relevant flight parameters. For example, the FBW system may adjust the collective stick to provide suggested or FBW-controlled flight parameters, and which reflect a collective or power setting. Thus, when the pilot releases the collective stick and the FBW provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift, or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of systems presented herein are directed to providing an actuator control system (ACS) for a rotorcraft. Aspects of the ACS described herein include distributing signal and excitation channels between the actuators on a rotorcraft. The ACS described herein may be used in, for example, rotorcraft having a single rotor system (e.g., helicopters) or rotorcraft having two or more rotor systems. For example, some of the actuators of a first rotor system and some of the actuators of a second rotor system may be connected to a first channel. Other actuators of the first rotor system and other actuators of the second rotor system are connected to a second channel. In this manner, a failure that affects one channel does not affect all of the actuators of one of the two rotor systems. The ACS described herein can reduce unwanted actuator motion and resulting unwanted rotorcraft response before a failure is detected and the channel is deactivated, and can also improve rotorcraft stability after the channel is deactivated.

Figure 1B:
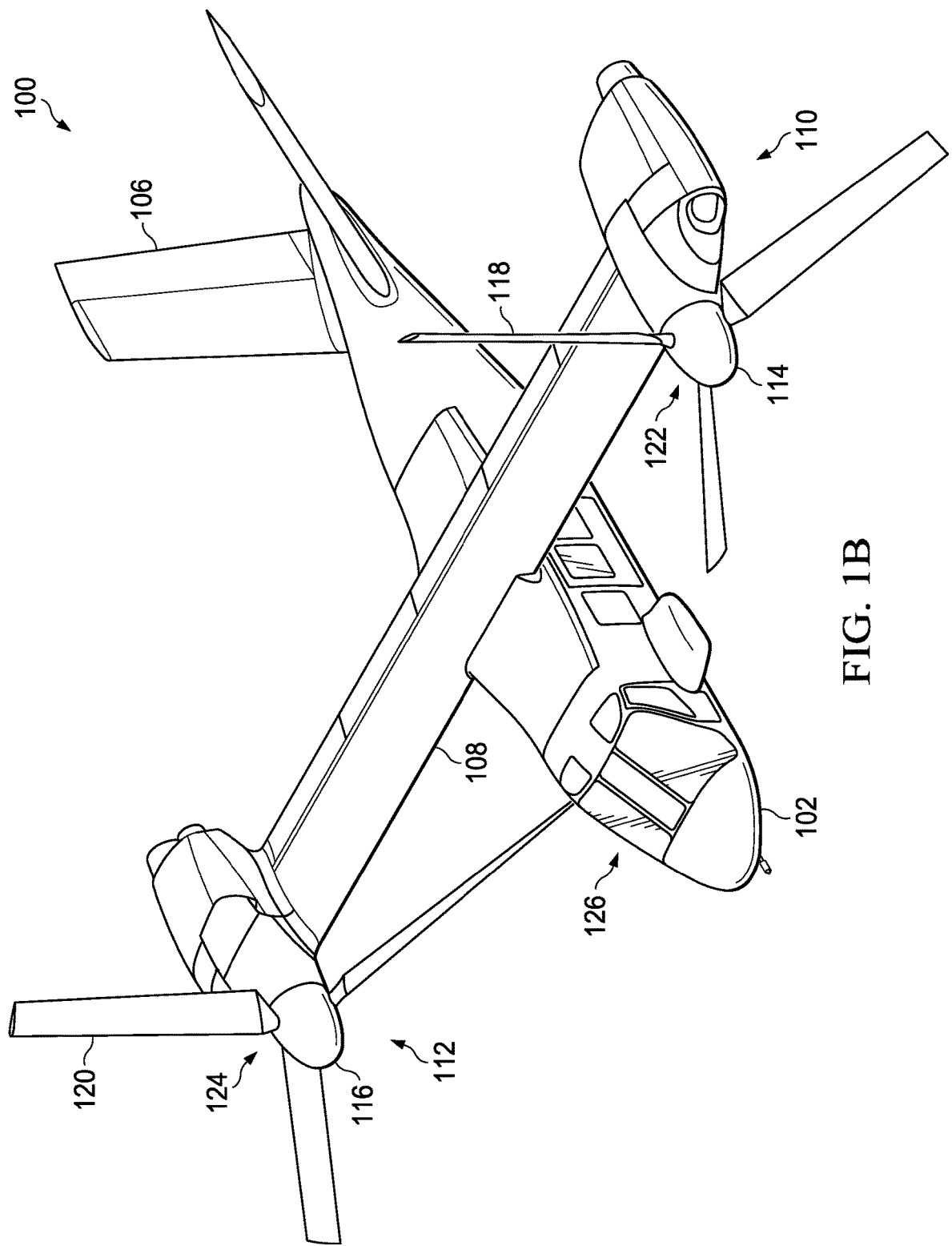
FIG. 1B representatively illustrates a tiltrotor aircraft in an airplane mode, in accordance with an embodiment.

FIGS. 1A and 1B illustrate a tiltrotor aircraft 100 according to some embodiments. Tiltrotor aircraft 100 includes a left rotor system no and a right rotor system 112. The left rotor system no includes a left fixed engine (not shown in FIGS. 1A-1B) that provides power to a left proprotor 114 having a plurality of rotor blades. A single rotor blade 118 is labeled in FIGS. 1A-1B. Right rotor system 112 includes a right fixed engine (not shown in FIGS. 1A-1B) that provides power to a right proprotor 116 having a plurality of rotor blades 120. A single rotor blade 120 is labeled in FIGS. 1A-1B. The fixed engines of the left rotor system 110 and the right rotor system 112 may be controlled according to signals from the FBW system. The pitch of the left rotor blades 118 may be controlled by a left swashplate 122, and the pitch of the right rotor blades 120 may be controlled by a right swashplate 124. The left swashplate 122 and the right swashplate 124 selectively control the attitude, altitude, and movement of the tiltrotor aircraft 100. The left and right swashplates 122, 124 may be used to collectively or cyclically change the pitch of the rotor blades 118, 120 respectively. The position and orientation of each swashplate 122, 124 is changed by one or more actuators (not shown in FIGS. 1A-1B). In some embodiments, the FBW system sends electrical signals to the swashplate actuators to control flight of tiltrotor aircraft 100.

Rotorcraft 101 further includes a wing 108, landing gear 104, fuselage 102, and tail section 106. Tail section 106 may have other flight control devices such as horizontal or vertical stabilizers, rudder, elevators, or other control or stabilizing surfaces that are used to control or stabilize flight of tiltrotor aircraft 100, which may include differing platform stability considerations depending on the applied configuration. Fuselage 102 includes a cockpit 126, which includes displays, controls, and instruments. It should be appreciated that even though tiltrotor aircraft 100 is depicted as having certain illustrated features, tiltrotor aircraft 100 may have a variety of implementation-specific configurations. For instance, in some embodiments, cockpit 126 may be configured to accommodate a pilot or a pilot and co-pilot. It is also contemplated, however, that tiltrotor aircraft 100 may be operated remotely, in which case cockpit 126 could be configured as a fully functioning cockpit to accommodate a pilot (and possibly a co-pilot as well) to provide for greater flexibility of use, or could be configured with a cockpit having limited functionality (e.g., a cockpit with accommodations for only one person functioning as the pilot, operating perhaps with a remote co-pilot, or as a co-pilot or back-up pilot with primary piloting functions being performed remotely). In yet other contemplated embodiments, tiltrotor aircraft 100 could be configured as an unmanned vehicle, in which case cockpit 126 could be eliminated entirely in order to save space and cost.

FIG. 1A illustrates tiltrotor aircraft 100 in a grounded helicopter mode, in which proprotors 114 and 116 are positioned substantially vertical to provide a lifting thrust. FIG. 1B illustrates tiltrotor aircraft 100 in an airplane mode, in which proprotors 114 and 116 are positioned substantially horizontal to provide a forward thrust, in which a lifting force is supplied by wing 108. It should be appreciated that tiltrotor aircraft can be operated such that proprotors 114 and 116 are selectively positioned between airplane mode and helicopter mode, which can be referred to as a conversion mode.

Figure 2:
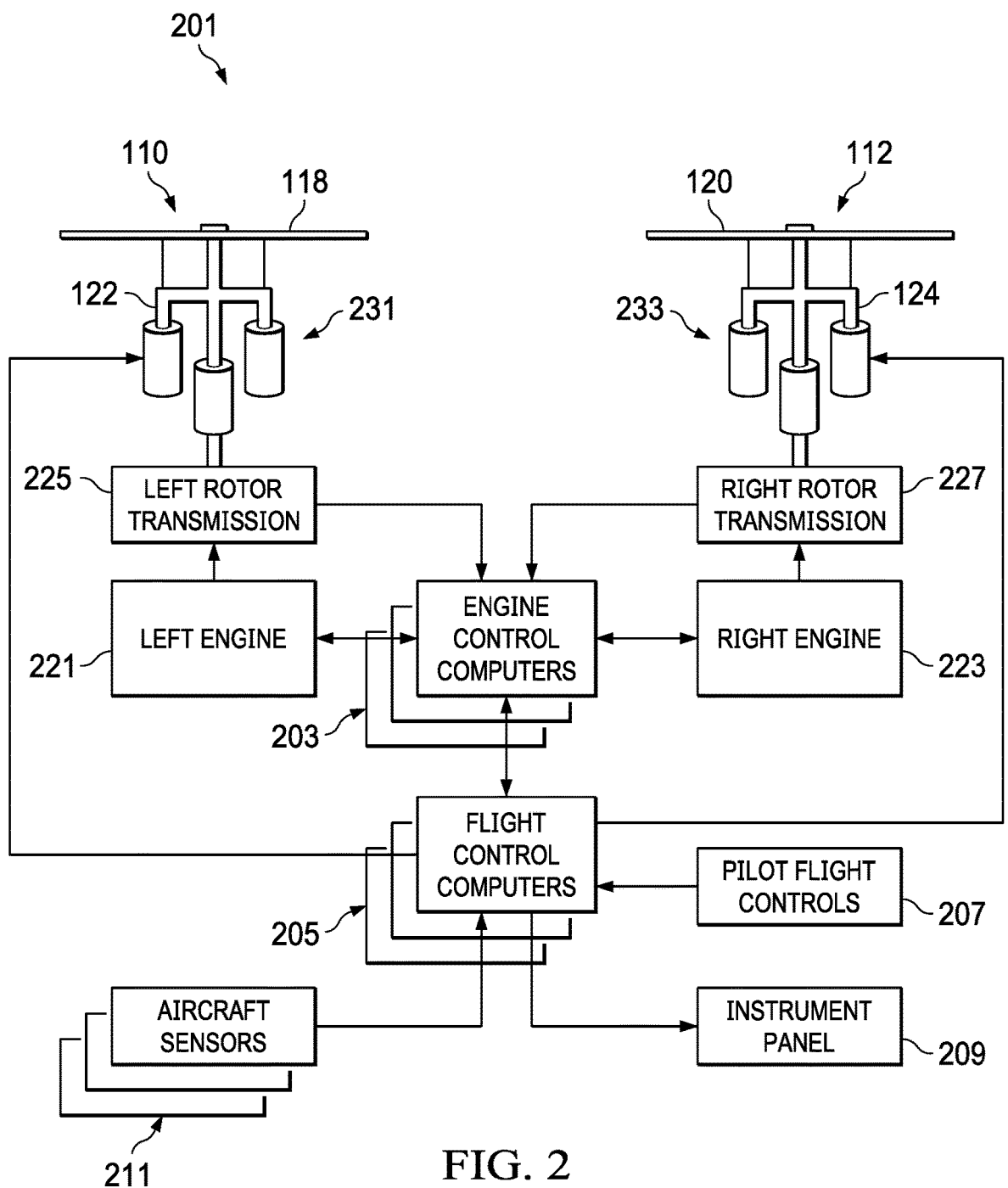
FIG. 2 representatively illustrates a fly-by-wire (FBW) flight control system for a tiltrotor aircraft according to some embodiments.

FIG. 2 illustrates a fly-by-wire (FBW) flight control system 201 for a tiltrotor aircraft according to some embodiments. The FBW flight control system 201 may be used in a tiltrotor aircraft such as tiltrotor aircraft 100, or another type of rotorcraft. A pilot may manipulate one or more pilot flight controls 207 to control aerodynamic flight of the aircraft. The pilot flight controls 207 may include manual controls, such as a cyclic stick, a collective stick, pedals, or the like. Inputs provided by the pilot to the pilot flight controls 207 may be transmitted mechanically or electronically (e.g., via the FBW flight control system) to flight control devices by the flight control system 201. Flight control devices may represent devices operable to change the flight characteristics of the aircraft. Flight control devices on the aircraft may include mechanical or electrical systems operable to change the positions or angles of attack of left rotor blades 118 via left swashplate 122 and right rotor blades 118 via right swashplate 122, or to change the power outputs of the left engine 221 and right engine 223, as examples. Flight control devices include left actuators 231 that adjust the left swashplate 122 and right actuators 233 that adjust the right swashplate 124. The flight control system 201 may adjust the flight control devices substantially independently of the flight crew in order to stabilize the rotorcraft, reduce workload of the flight crew, or the like. The flight control system 201 includes engine control computers (ECCUs) 203, flight control computers (FCCs) 205, and aircraft sensors 211, which together adjust the flight control devices.

Flight control system 201 has one or more FCCs 205. In some embodiments, multiple FCCs 205 are provided for redundancy. In FIG. 2, multiple FCCs 205 are shown schematically as a "stack" of FCCs 205. One or more modules within FCCs 205 may be partially or wholly embodied as software or hardware, e.g., for performing functionality described herein. In embodiments where the flight control system 201 is a FBW flight control system, the FCCs 205 may analyze pilot inputs and dispatch corresponding commands to ECCUs 203, left actuators 231, or right actuators 233. Further, FCCs 205 are configured and receive input commands from the pilot controls through sensors associated with each of the pilot flight controls. The input commands are received by measuring the positions of the pilot controls. FCCs 205 may also control tactile cues to the pilot controls, or display information in instruments on, for example, an instrument panel 209.

ECCUs 203 control left engine 221 and right engine 223. For example, ECCUs 203 may vary the output power of left engine 221 to control the rotational speed of left rotor blades 118, or vary the output of right engine 223 to control the rotational speed of right rotor blades 120. ECCUs 203 may control the output power of left engine 221 and right engine 223 according to commands from FCCs 205, or may do so based on feedback such as measured RPM of left rotor blades 118 or rotor blades 120. In some embodiments, some or all of ECCUs 203 are incorporated within FCCs 205.

Aircraft sensors 211 are in communication with the FCCs 205. Aircraft sensors 211 may include sensors for measuring a variety of rotorcraft systems, flight parameters, environmental conditions, or the like. For example, aircraft sensors 211 may include sensors for measuring airspeed, altitude, attitude, position, orientation, temperature, airspeed, vertical speed, or the like. Other sensors 211 could include sensors measuring or otherwise detecting data or signals originating external to the rotorcraft, such as a global positioning system (GPS) sensor, a VHF Omnidirectional Range sensor, Instrument Landing System (ILS), or the like. Other aircraft sensors may, for example, detect or otherwise measure the position or status of actuators. For example, the sensors may be Linear Variable Differential Transformer (LVDT) sensors, or other types of sensors coupled to actuators 231, 233 or other actuators. An actuator sensor may provide feedback signals to FCCs 205 indicating absolute position, relative position, or position change of an actuator, and in some cases, certain signals or absence of signals may indicate actuator failure or sensor failure.

Figure 3:
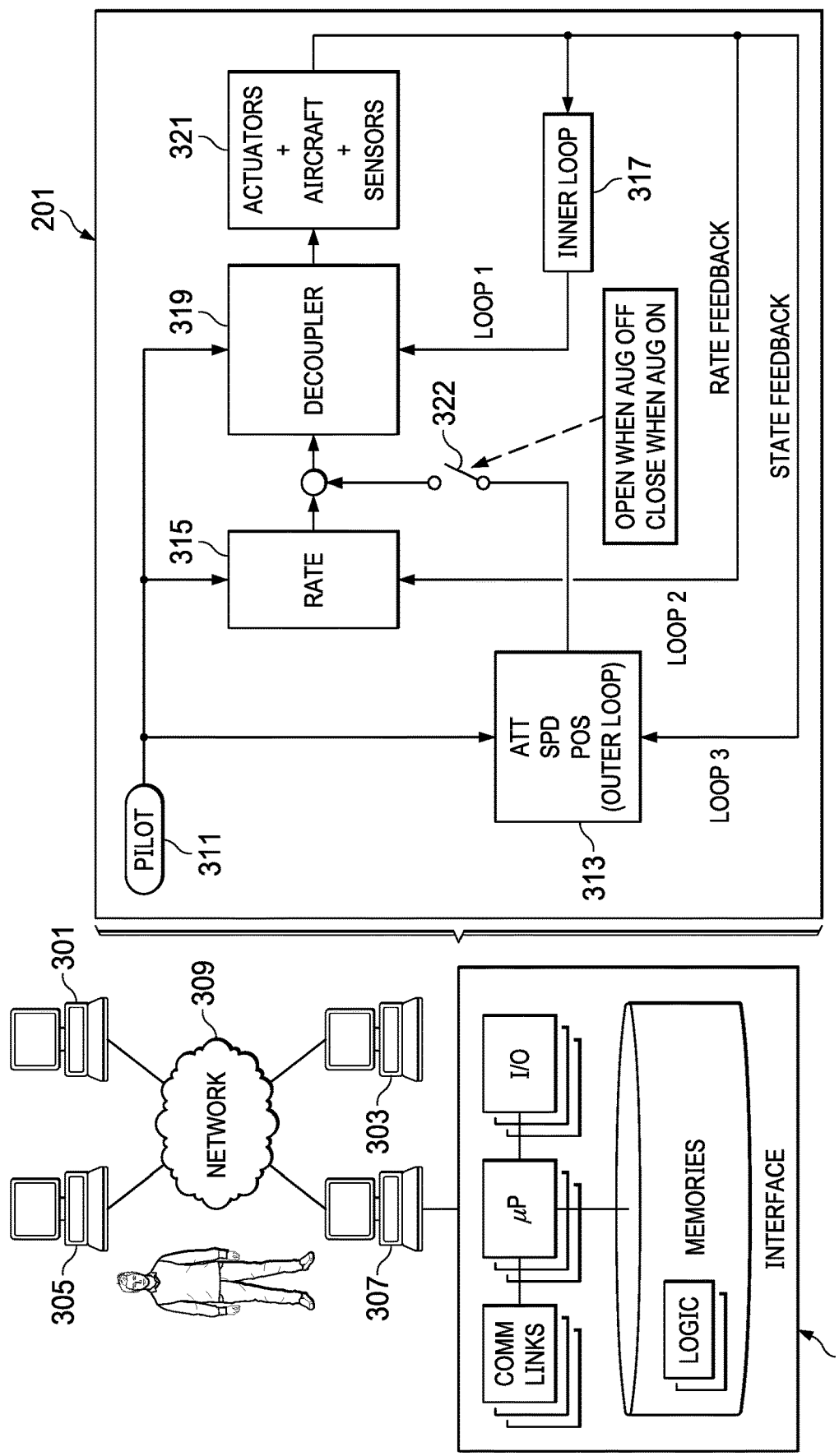
FIG. 3 representatively illustrates a three-loop flight control system according to some embodiments.

Moving now to operational aspects of flight control system 201, FIG. 3 representatively illustrates (in a highly schematic fashion) an example manner in which flight control system 201 may implement FBW functions as a series of inter-related feedback loops associated with certain control laws. FIG. 3 representatively illustrates a three-loop flight control system 201 according to an embodiment. In some embodiments, elements of three-loop flight control system 201 may be implemented at least partially by FCCs 205. As shown in FIG. 3, however, all, some, or none of components 310, 303, 305, 307 of three-loop flight control system 201 could be located external or remote from the aircraft 100, and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to components driving flight control devices, such as left actuators 231 and right actuators 233, to sensors, such as aircraft sensors 211, etc., or the like).

In the example of FIG. 3, a three-loop design separates the inner stabilization and rate feedback loops from outer guidance and tracking loops. The control law structure primarily assigns overall stabilization tasks and related tasks of reducing pilot workload to inner loop 317. Next, middle loop 315 provides rate augmentation. Outer loop 313 attends to guidance and tracking tasks. Since inner loop 317 and rate loop 315 provide most of the stabilization, less control effort may be required at the outer loop level. As representatively illustrated in FIG. 3, a switch 322 may be provided to turn outer loop flight augmentation on and off. In general, tasks of outer loop 313 are not indicated for flight stabilization.

In some embodiments, inner loop 317 and rate loop 315 include a set of gains and filters applied to roll/pitch/yaw 3-axis rate gyro and acceleration feedback sensors. Both inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, control laws operating in the illustrated the loops allow for decoupling of otherwise coupled flight characteristics, which in turn may provide for more stable flight characteristics and reduced pilot workload. Furthermore, outer loop 313 may allow for automated or semi-automated operation of certain high-level tasks or flight patterns, thus further relieving or otherwise reducing pilot workload, and allowing the pilot to focus on other matters, including observation of the surrounding terrain.

Figure 4:
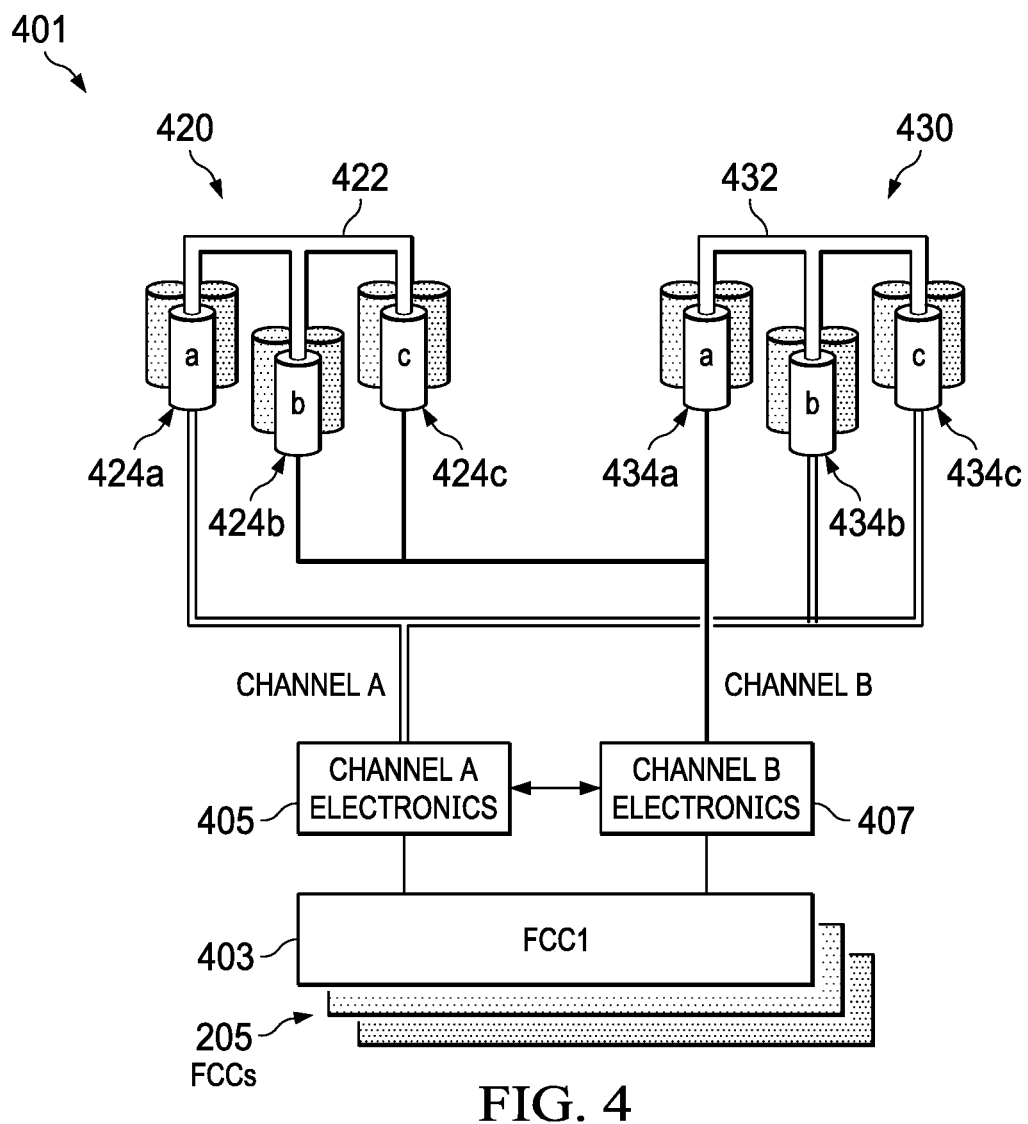
FIG. 4 representatively illustrates an Actuator Control System (ACS) for an aircraft according to some embodiments.

FIG. 4 illustrates an actuator control system (ACS) 401 for an aircraft according to some embodiments. ACS 401 may be used in an aircraft such as tiltrotor aircraft 100 shown previously, in another type of rotorcraft, or in another type of aircraft. ACS 401 may be part of a flight control system such as flight control system 201 shown in FIG. 2 and FIG. 3. In accordance with representative aspects, ACS 401 includes a left rotor system 420 and a right rotor system 430. Left rotor system 420 and right rotor system 430 may be similar to left rotor system no and right rotor system 112 shown in FIGS. 1A and 1B, for example. Left rotor system 420 includes a left swashplate 422 having three control points, and right rotor system 420 includes a right swashplate 432 having three control points. For left swashplate 422 and right swashplate 432, each control point is coupled to a set of actuators that adjust the left swashplate 422 or right swashplate 432 at that control point. In some embodiments, left swashplate 422 or right swashplate 432 may have one or more control points, and for each control point the associated set of actuators may include one or more actuators. In the example shown in FIG. 4, left swashplate 422 is coupled to three sets of actuators, and each set contains three actuators. Three left actuators 424a-c are labeled in FIG. 4, which includes one actuator from each set of the three sets of actuators coupled to the left swashplate 422. Similarly, right swashplate 432 is shown as coupled to three sets of actuators, each set containing three actuators. Three right actuators 434a-c are labeled in FIG. 4, which includes one actuator from each set of the three sets of actuators coupled to the right swashplate 432. Each actuator may have associated sensors (e.g., position sensors or other sensors), which for clarity are not shown in FIG. 4. While left rotor system 420 and right rotor system 430 are shown having three sets of three actuators each, a rotor system may have more or fewer sets of actuators or actuators within each set, and rotor systems may have the same number of actuators or have a different number of actuators. The actuators may also have a different configuration or arrangement than that shown, and the actuators may be coupled to an aircraft component other than a swashplate. In other embodiments, the aircraft may have more than two rotor systems.

The ACS 401 also includes one or more FCCs. An example FCC1 403 is shown in FIG. 4. The FCC1 403 may be similar to an FCC 205 described herein, and may be one of multiple FCCs (shown schematically in FIG. 4 as a "stack" of FCCs 205) provided for redundancy. In ACS 401, each of actuators 424a-c and 434a-c are communicatively coupled to FCC1 403 by a channel. Other actuators (e.g., from the sets of actuators) may be communicatively coupled to other FCCs. Connections between other actuators and other FCCs have been omitted in FIG. 4 for clarity. In some embodiments, other actuators are coupled to other FCCs in a similar manner as described herein for FIG. 4. A channel can, for example, include wiring through which sensors or actuators can receive power, through which the FCC1 403 can send command signals to actuators or sensors, or through which the FCC1 403 can receive feedback signals from the actuators or sensors. For example, a channel may transmit power (e.g., currents, voltages, etc.) or communication signals (e.g., analog signals, digital signals, etc.). In some cases where multiple FCCs are used, a particular channel can be connected to more than one FCC. In some cases, a channel includes one or more sets of wiring connecting components associated with that channel. For example, a single channel may transmit control signals to a set of actuators using a set of wiring, and the channel may transmit feedback signals from the actuators' associated sensors using the same set of wiring or using a different set of wiring. A channel may also include a separate set of wiring to provide power to actuators or sensors associated with that channel. In some cases, a channel may transmit control signals to one or more actuators, and a different channel may receive feedback signals from some or all of the actuators' associated sensors. These are examples, and other configurations of channels and wiring are possible.

ACS 401 shown in FIG. 4 includes two channels coupled to FCC1 403, designated "Channel A" and "Channel B." Each of Channel A and Channel B are communicatively coupled to individual actuators within left actuators 424a-c and right actuators 434a-c. For simplicity, Channel A and Channel B are shown in FIG. 4 having only one set of wiring each, though as described previously, a channel may include multiple sets of wiring. ACS 401 may also include electronic components associated with each channel. For example, ACS 401 includes Channel A Electronics 405 associated with Channel A, and Channel B Electronics associated with Channel B. In some embodiments, Channel A Electronics 405 and Channel B Electronics 407 are part of FCC1 403, and in some embodiments, Channel A Electronics 405 and Channel B Electronics are separate components or modules coupled to FCC1 403. Channel A Electronics 405 and Channel B Electronics may also be communicatively coupled to each other, to other FCCs, or to other components. In some cases, channel electronics may include components such as analog-to-digital converters, digital-to-analog converters, modulators, demodulators, signal summing components, processors, circuitry, servoamplifiers, analog or digital filters, analog or digital switches, voltage regulators, the like, or other components.

As shown in FIG. 4, left actuators 424a-c in left rotor system 420 and right actuators 434a-c in right rotor system 430 are distributed between both Channel A and Channel B. That is, some actuators of left actuators 424a-c and some actuators of right actuators 434a-c are connected to Channel A, and other actuators of left actuators 424a-c and other actuators of right actuators 434a-c are connected to Channel B. For the example ACS 401 representatively illustrated in FIG. 4, left actuator 424a and right actuators 434b and 434c are connected to Channel A, and left actuators 424b and 424c and right actuator 434a are connected to Channel B. In other embodiments, actuators may be connected to channels in other configurations. For example, one channel may be connected to one or more actuators in a first rotor system and all of the actuators in a second rotor system. Alternatively, one channel may be connected to only a single actuator in each rotor system. Other alternative or conjunctive configurations are also possible. In some embodiments, both rotor systems may include cyclic actuators and collective actuators, where cyclic actuators or collective actuators of each rotor system may be distributed between channels. In some embodiments, actuators may be distributed between more than two channels.

If all of the actuators of a single rotor system are connected to a single channel, then a failure of that channel can affect all of the connected actuators. For example, failures affecting a channel can include a wiring short that affects actuator control signals or sensor feedback signals, a failure of the electronics connected to the channel, a power supply failure of the electronics or an FCC connected to the channel, or other type of failure. In some cases, after a channel fails, the connected actuators can continue to move until the failure is detected and the channel is deactivated (e.g., by an FCC or other component). A channel failure can thus produce a transient motion in an actuator. In the case of swashplate actuators, this transient actuator response results in a transient motion of the swashplate, which results in a transient motion of the aircraft. For example, a channel failure can result in all of the connected actuators undergoing transient motion in a same direction, resulting in an unwanted collective motion of the associated swashplate. This transient motion can potentially place the aircraft in an unstable or unsafe state.

However, by having a rotor system's actuators connected to different channels (e.g., as shown in FIG. 4), a channel failure affects fewer actuators of a particular rotor system. For example, if Channel A shown in FIG. 4 were to fail, left actuator 424a of left rotor system 420 and right actuators 434b and 434c of right rotor system 430 would be affected. Since left rotor actuators 424b and 424c would remain operational, the transient response of left rotor system 420 may be less than that resulting if all of left rotor actuators 424a-c were to fail. Likewise, the transient response of the right rotor system 430 may be less than that if all of right rotor actuators 434a-c were to fail. In some cases, the transient response of a rotor system may be lessened in part due to the remaining operational (non-failing) actuators providing forces opposing the failing actuator. In some cases, the transient response of a rotor system may be lessened in part due to the affected actuators imparting a cyclic transient response to the rotor system instead of imparting a collective transient response which might occur if all of the rotor system's actuators were affected. In some cases, the technique described herein may be used to limit the effect of a transient on the aerodynamic control of an aircraft. For some systems where there is additional mechanical coupling as well as redundant actuation, the technique described herein may be used to lessen a torque or a load generated in a failure which may be transmitted into any mechanical interconnects.

In some embodiments, the phasing (i.e., polarity) of the actuator control signals or sensor feedback signals on a single channel can be configured such that a failure of that channel causes connected actuators to move in certain directions, such as in opposite directions, which can reduce the severity of a transient response. For example, left actuator 424b may have an opposite phase than left actuator 424c, or signals communicated to left actuator 424b may have an opposite polarity than signals communicated to left actuator 424c. If Channel B shown in FIG. 4 were to fail, left actuator 424b would move in a direction opposite to left actuator 424c. This is an illustrative example, and other configurations of actuators having different phases or different configurations of signals having opposite polarity are possible. In this manner, the phasing of actuators may be configured to reduce transient motion or improve rotorcraft stability after a failure.

In some embodiments, the locations of control points on a swashplate may be configured to reduce transient effects. Additionally, the channels or wiring coupled to the actuators associated with each control point may be configured to reduce transient effects. For example, in some cases, actuation at a lateral axis of a swashplate may be less likely to induce transient effects than actuation at a longitudinal axis of the swashplate. In this case, more actuators at a lateral axis could be coupled to the same channel, and fewer actuators at the longitudinal axis could be coupled to the same channel. Thus, in the event of a channel failure, the transient response may be lessened due to most of the affected actuators being at the lateral axis, which is less prone to transients than the longitudinal axis. In other words, by coupling swashplate actuators at different control points to different channels, transient effects can be redistributed in part or in full from a control axis with low stability margins to an axis with higher stability margins. For example, left actuators 424b-c may be positioned at a lateral axis of swashplate 422, and right actuator 434a may be positioned at a longitudinal axis of swashplate 432. If Channel B shown in FIG. 4 were to fail, a transient response of the left swashplate 422 may be lessened because left actuators 424b-c are located at the lateral axis. Additionally, a transient response of the right swashplate 432 may be lessened because only one actuator at a longitudinal axis (i.e., right actuator 434a) is affected. This is an illustrative example, and other configurations of actuators or control points having different locations on a swashplate are possible. In this manner, the positions of actuators on a swashplate and their coupled channels may be configured to reduce transient motion or improve rotorcraft stability after a failure.

In some embodiments, different channels may also have different phasing. For example, Channel A shown in FIG. 4 may have an opposite phase than Channel B. If both Channel A and Channel B were to fail (e.g., due to the failure of a common power source, failure of FCC 403, or another failure), the actuators coupled to Channel A would move in an opposite direction to the actuators coupled to Channel B. In some embodiments, different channels may have different phasing, and different actuators coupled to a single channel may also have different phasing. In this manner, a failure affecting multiple channels may cause actuators coupled to those channels to move in directions that minimize or reduce a transient response, or that maximize or improve rotorcraft stability.

Figure 5:
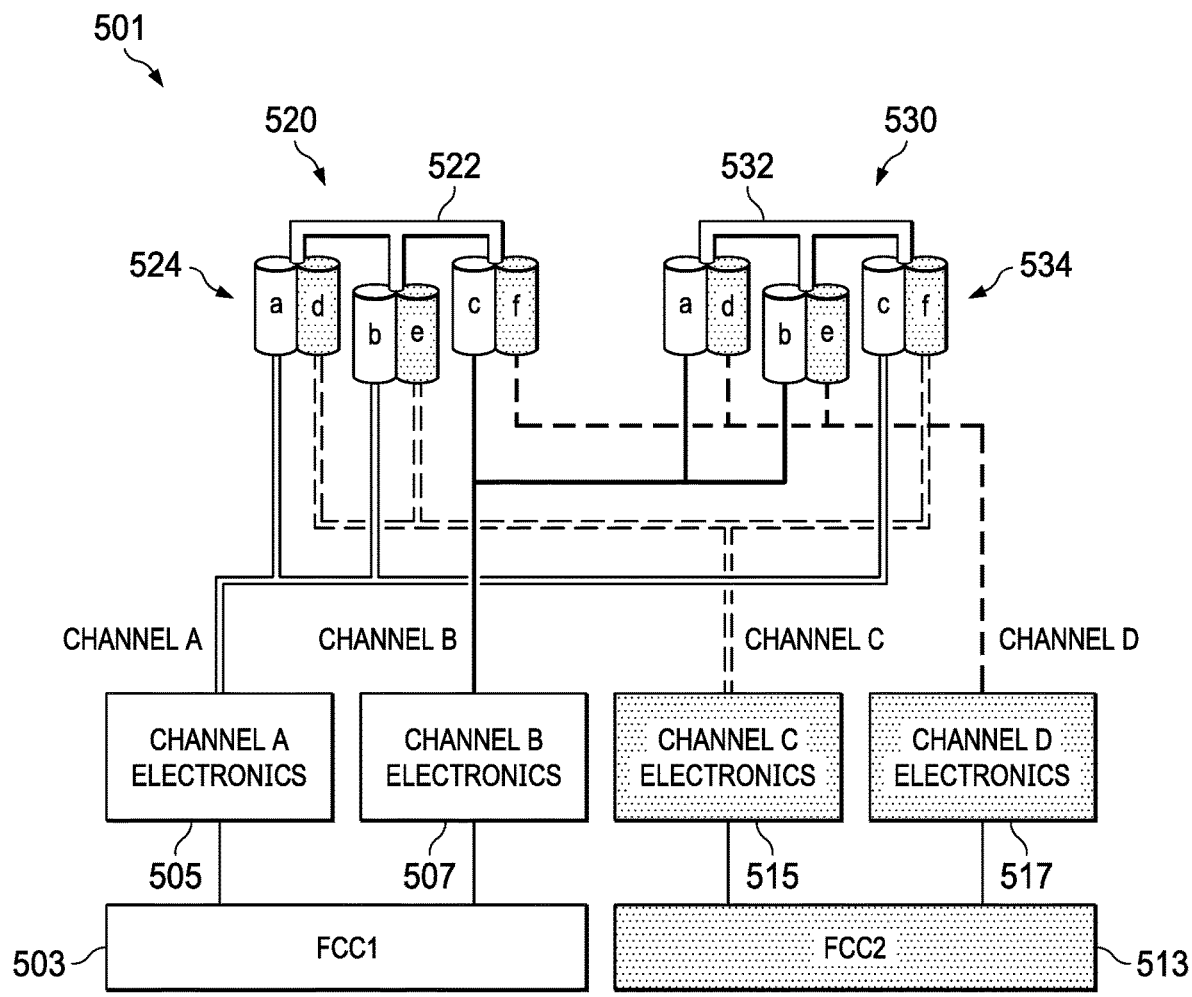
FIG. 5 representatively illustrates an ACS for an aircraft according to some embodiments.

FIG. 5 illustrates an ACS 501 for an aircraft having distributed actuator channel connections, according to some embodiments. ACS 401 may be used in an aircraft such as tiltrotor aircraft 100 shown previously, in another type of rotorcraft, or in another type of aircraft. ACS 501 includes a left rotor system 520 having a left swashplate 522 coupled to six left actuators 524a-f, and a right rotor system 530 including a right swashplate 532 coupled to six right actuators 534a-f. ACS 501 includes a first flight control computer FCC1 503 and a second flight control computer FCC2 513, though additional FCCs may also be used in other embodiments. In the example of ACS 501 shown in FIG. 5, FCC1 503 is connected to actuators 524a-b and 534c by Channel A and connected to actuators 524c and 534a-b by Channel B. Similarly, FCC2 513 is connected to actuators 524d-e and 534f by Channel C and connected to actuators 524f and 534d-e by Channel D. In some cases, Channels A-D may be similar to Channels A-B described above with respect to FIG. 4. ACS 501 also includes Channel A Electronics 505 and Channel B Electronics 507 connected to FCC1 503, and Channel C Electronics 515 and Channel D Electronics 507 connected to FCC2 513. In some embodiments, the channel electronics are isolated from each other. For example, each of Channel Electronics A-D may have separate and isolated power supplies, circuitry, processors, or other components. In this manner, a failure of one of Channel Electronics A-D is less likely to affect another of Channel Electronics A-D. Moreover, a failure of all of the channel electronics connected to a single FCC (e.g., Channel Electronics A-B connected to FCC1 503) is less likely. In other embodiments, the actuators may be connected to channels in other configurations, and more or fewer actuators, rotor systems, FCCs, channel electronics, or channels may be present. In some embodiments, left actuators 524*a-f* and right actuators 534*a-f* may include both cyclic actuators and collective actuators. In some cases, the effects of a single FCC failure, channel electronics failure, or channel failure can be mitigated by distributing the actuators of a single rotor system between two or more FCCs, channel electronics, or channels, such as shown in FIG. 5. In this manner, using more channels reduces the number of actuators of a single rotor system that are affected by a failure.

Figure 6:
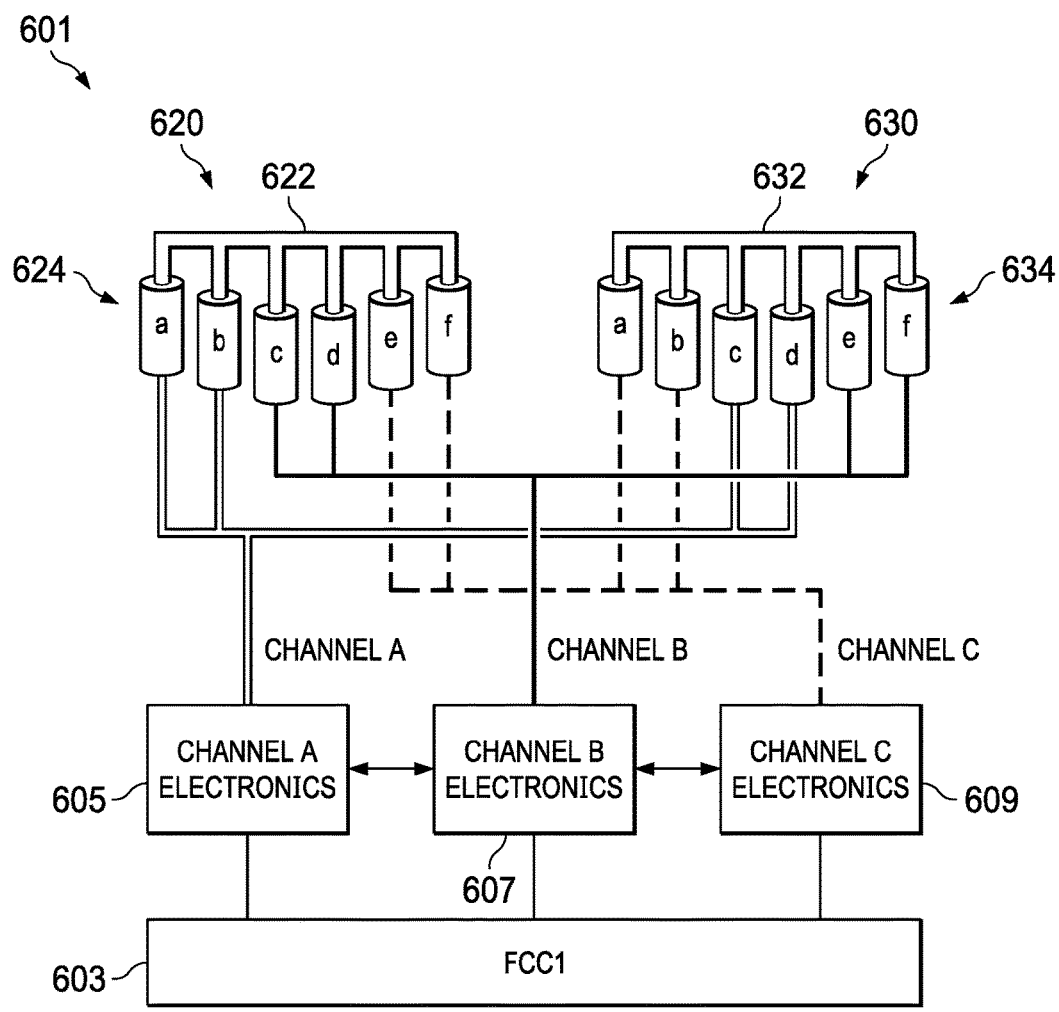
FIG. 6 representatively illustrates an ACS for an aircraft according to some embodiments.

FIG. 6 illustrates ACS 601 for an aircraft having distributed actuator channel connections, according to some embodiments. ACS 601 may be used in an aircraft such as tiltrotor aircraft 100 shown previously, in another type of rotorcraft, or in another type of aircraft. ACS 601 includes a left rotor system 620 having a left swashplate 622 coupled to six left actuators 624*a-f*, and a right rotor system 630 including a right swashplate 632 coupled to six right actuators 634*a-f*. ACS 601 includes a flight control computer FCC1 603, though additional FCCs may also be used. Other actuators may be communicatively coupled to other FCCs. Other actuators and other FCCs have been omitted in FIG. 6 for clarity. In the example of ACS 601 shown in FIG. 6, FCC1 603 is connected to actuators 624*a-f* and 634*a-f* by three channels (Channels A, B, and C). ACS 601 also includes Channel A Electronics 605, Channel B Electronics 607, and Channel C Electronics 609 connected to FCC1 603 and to each respective channel. In particular, left actuators 624*a* and 624*b* and right actuators 634*c* and 634*d* are connected to Channel A, left actuators 624*c* and 624*d* and right actuators 634*e* and 634*f* are connected to Channel B, and left actuators 624*e* and 624*f* and right actuators 634*a* and 634*b* are connected to Channel C. In other embodiments, the actuators may be connected to channels in other configurations, and more or fewer actuators, rotor systems, or channels may be present. In some embodiments, left actuators 624*a-f* and right actuators 634*a-f* may include both cyclic actuators and collective actuators. In some cases, the effects of a single channel failure can be further mitigated by distributing the actuators of a single rotor system between more than two channels, such as shown in FIG. 6. In this manner, using more channels reduces the number of actuators of a single rotor system that are affected if a channel fails. Having more operational actuators on a given rotor system can also decrease transient effects during a failure event and during flight after a channel failure.

Figure 7:
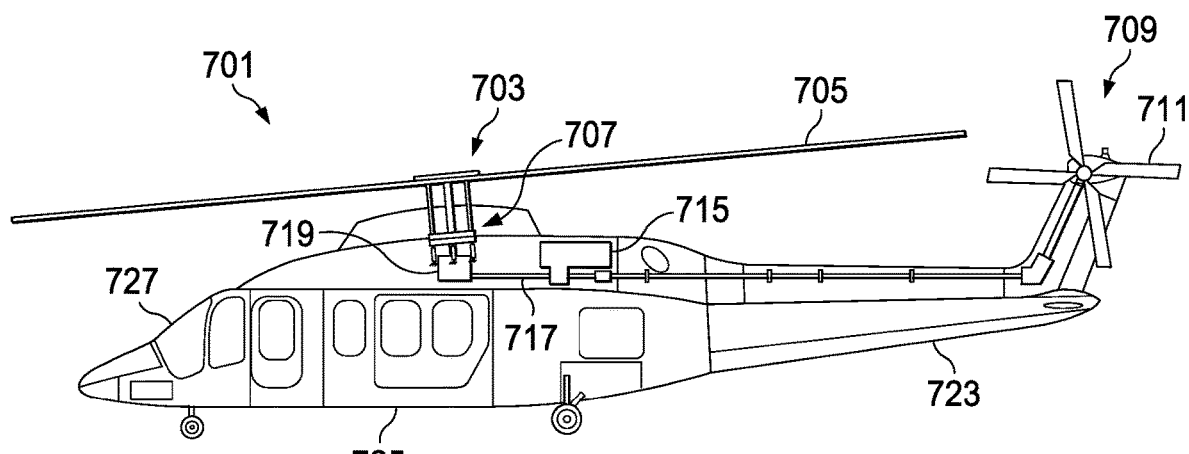
FIG. 7 representatively illustrates a rotorcraft according to some embodiments.

FIG. 7 representatively illustrates a rotorcraft 701 according to some embodiments. Rotorcraft 701 may be a single main rotor rotorcraft such as a helicopter. Rotorcraft 701 has a main rotor system 703, which includes multiple main rotor blades 705. The pitch of each main rotor blade 705 may be controlled by a swashplate 707 in order to selectively control the attitude, altitude, and movement of rotorcraft 701. Swashplate 707 may be used to collectively or cyclically change the pitch of main rotor blades 705. Rotorcraft 701 also has an anti-torque system, which may include a tail rotor 709. In rotorcraft with a tail rotor 709, the pitch of each tail rotor blade 711 is collectively changed in order to vary thrust of the anti-torque system, providing yaw control of rotorcraft 701. The pitch of tail rotor blades 711 is changed by one or more tail rotor actuators. In some embodiments, rotorcraft 701 includes a FBW system that sends electrical signals to the tail rotor actuators or main rotor actuators to control flight of the rotorcraft.

Power is supplied to main rotor system 703 and the anti-torque system by engines 715. There may be one or more engines 715, which may be controlled according to signals from the FBW system. The output of engine 715 is provided to a driveshaft 717, which is mechanically and operatively coupled to rotor system 703 and the anti-torque system through a main rotor transmission 719 and a tail rotor transmission, respectively.

Rotorcraft 701 further includes a fuselage 725 and tail section 723. Tail section 723 may have other flight control devices such as horizontal or vertical stabilizers, rudder, elevators, or other control or stabilizing surfaces that are used to control or stabilize flight of rotorcraft 701. Fuselage 725 includes a cockpit 727, which includes displays, controls, and instruments. It should be appreciated that even though rotorcraft 701 is depicted as having certain illustrated features, rotorcraft 701 may have a variety of implementation-specific configurations. For instance, in some embodiments, cockpit 727 may be configured to accommodate a pilot or a pilot and co-pilot, as illustrated. It is also contemplated, however, that rotorcraft 701 may be operated remotely, in which case cockpit 727 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating with a remote co-pilot, or who would function as a co-pilot or back-up pilot with primary piloting functions being performed remotely). In yet other contemplated embodiments, rotorcraft 701 could be configured as an unmanned vehicle, in which case cockpit 727 could be eliminated entirely in order to save space and cost.

Figure 8:
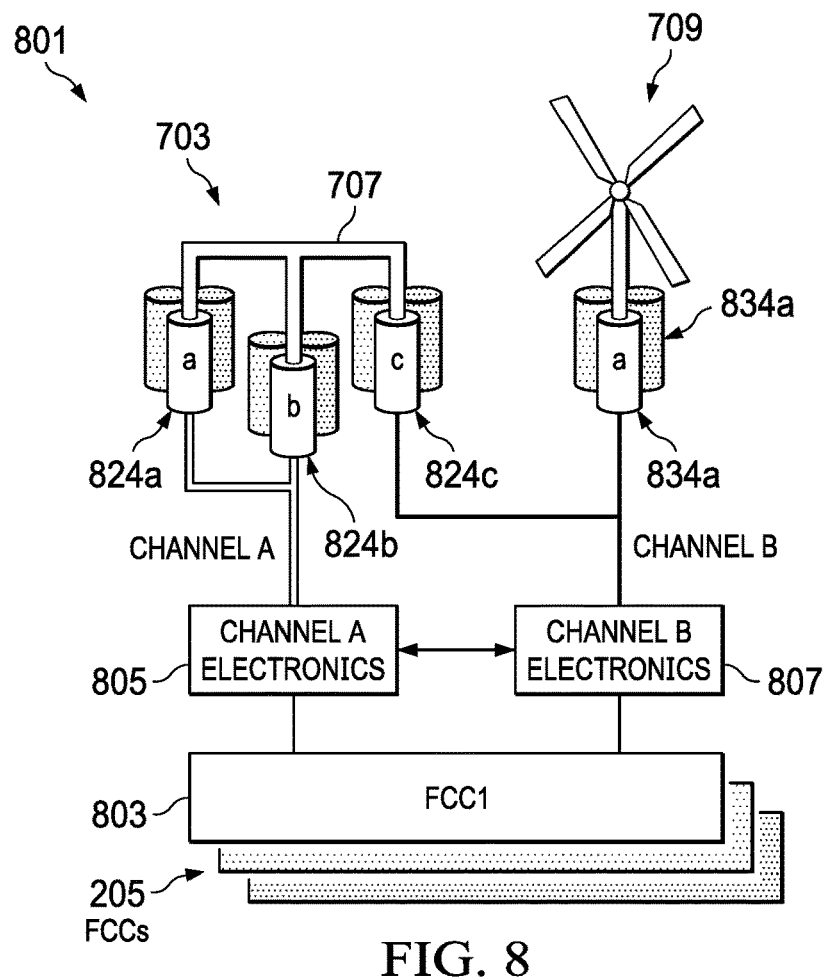
FIG. 8 representatively illustrates an ACS for a rotorcraft according to some embodiments.

FIG. 8 illustrates an ACS 801 for a rotorcraft having distributed actuator channel connections, according to some embodiments. ACS 801 may be used in rotorcraft 701 shown previously, or another type of rotorcraft. ACS 801 includes main rotor system 703 having swashplate 707 coupled to three sets of actuators. Three main actuators 824*a-c* are labeled in FIG. 8, which includes one actuator from each set of the three sets of actuators coupled to swashplate 707. ACS 801 also includes the tail rotor 709 coupled to a set of tail actuators, one of which is labeled as tail actuator 834*a*. In some embodiments, swashplate 707 or tail rotor 709 are coupled to more or fewer sets of actuators than shown, and each set of actuators may have more or fewer actuators than shown. ACS 801 includes a flight control computer FCC1 803, though multiple FCCs may also be used. The FCC1 803 may be similar to an FCC 205 described herein, and may be one of multiple FCCs (shown schematically in FIG. 8 as a "stack" of FCCs 205) provided for redundancy. Other actuators (e.g., from the sets of actuators) may be communicatively coupled to other FCCs. Connections between other actuators and other FCCs have been omitted in FIG. 8 for clarity. In the example ACS 801 shown in FIG. 8, FCC1 803 is connected to the actuators 824*a-c* and 834*a* by two channels (Channels A and B). ACS 801 also includes Channel A Electronics 805 and Channel B Electronics 807 connected to FCC1 803 and to each respective channel. Main actuators 824*a-b* are connected to Channel A, and main actuator 824*c* and tail actuator 834*a* are connected to Channel B. In other embodiments, the actuators may be connected to channels in other configurations, and more or fewer actuators, rotor systems, or channels may be present. As shown in FIG. 8, actuators on rotorcraft having a single main rotor and a tail rotor may also be distributed between multiple channels. In this manner, a failure on a single channel would not affect all of the main rotor actuators, thus lessening potential effects of failure.

Figure 9:
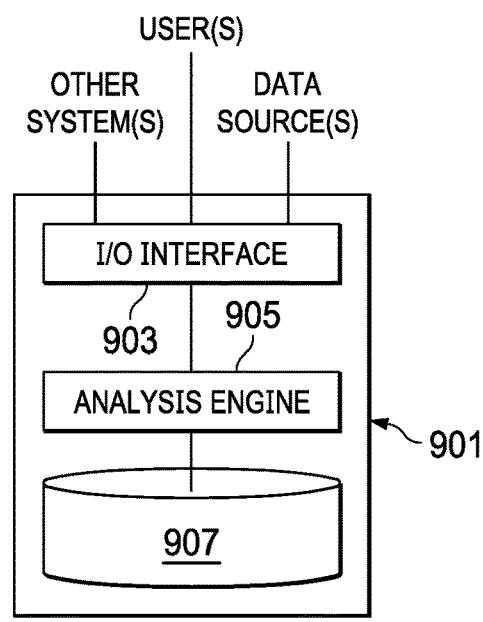
FIG. 9 representatively illustrates a computer system according to some embodiments.

FIG. 9 illustrates a computer system 901 according to some embodiments. Computer system 901 can be configured for performing one or more functions with regard to operation of flight control system 201, FCCs described herein, or ACSs described herein. Further, any processing or analysis can be partly or fully performed by computer system 901. Computer system 901 can be partly or fully integrated with other rotorcraft computer systems. In some embodiments, computer system 901 is an FCC, and performs processing in conjunction with other, redundant FCCs.

Computer system 901 can include an input/output (I/O) interface 903, an analysis engine 905, and a database 907. Alternative embodiments can combine or distribute I/O interface 903, analysis engine 905, and database 907, as desired. Embodiments of computer system 901 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein Thus, while representative embodiments are described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

I/O interface 903 can provide a communication link between external users, systems, and data sources and components of computer system 901. I/O interface 903 can be configured for allowing one or more users to input information to computer system 901 via any input device, whether now known or hereafter derived in the art. Examples can include a keyboard, mouse, touch screen, and/or any other desired input device. I/O interface 903 can be configured for allowing one or more users to receive information output from computer system 901 via any known output device. Examples can include a display monitor, a printer, cockpit display, and/or any other desired output device. I/O interface 903 can be configured for allowing other systems to communicate with computer system 901. For example, I/O interface 903 can allow one or more remote computers to access information, input information, and/or remotely instruct computer system 901 to perform one or more of the tasks described herein. I/O interface 903 can be configured to interact with one or more rotorcraft sensors such as those described herein. I/O interface 903 can be configured for allowing communication with one or more remote data sources. For example, I/O interface 903 can allow one or more remote data source(s) to access information, input information, or remotely instruct computer system 901 to perform one or more of the tasks described herein.

Database 907 provides persistent data storage for computer system 901. Although the term "database" is primarily used, a memory or other suitable data storage arrangement may provide functionality of database 907. In alternative or conjunctive embodiments, database 907 can be integral to or separate from computer system 901, and can operate on one or more computers. Database 907 may be configured to provide non-volatile data storage for any information suitable to support operation of FCCs and ACSs, including various types of data discussed further herein. Analysis engine 905 can include various combinations of one or more processors, memories, or software components.

In accordance with an embodiment as representatively illustrated in FIG. 9, a method 900 for implementing an actuator control system (ACS) begins at 910 with a step 920 representing optional pre-processing that a flight control computer (FCC) or other electronics may engage (or be engaged in) preliminary to the transmitting of signals from the FCC to first rotor actuators via a first channel in step 922. For example, optional pre-processing 920 may comprise signal processing, signal amplification, signal modulation, signal demodulation, digital-to-analog conversion, or other types of pre-processing. After any optional pre-processing of step 920, signals are transmitted from the FCC to first rotor actuators via the first channel in step 922. The signals may be actuator control signals or another type of signal. The signals are received at the first rotor actuators in step 924. In response to receiving the signals, in step 926 first rotor actuators may optionally move a first swashplate coupled to first rotor actuators. In optional step 928, signals are transmitted from the first rotor actuators to the FCC. The signals transmitted to the FCC in step 928 may comprise, for example, sensor feedback signals. The signals in step 928 may be transmitted to the FCC via the first channel. Step 930 represents optional post-processing that the FCC may optionally engage after receiving the signals transmitted in step 928. The optional post-processing of step 930 may comprise, for example, signal processing, signal amplification, signal modulation, signal demodulation, analog-to-digital conversion, or other types of post-processing. Steps 928-930 may be performed sequentially to steps 920-926, or some or all of steps 928-930 may be performed at the same time as steps 920-926.

The method 900 representatively illustrated in FIG. 9 also begins at 910 with a step 940 representing optional pre-processing that the FCC or other electronics may engage (or be engaged in) preliminary to the transmitting of signals from the FCC to second rotor actuators via the first channel in step 942. Optional pre-processing 940 may include the same or similar, or different, elements as optional pre-processing step 920. After any optional pre-processing of step 940, signals are transmitted from the FCC to second rotor actuators via the first channel in step 942. The signals are received at second rotor actuators in step 944. In response to receiving the signals, in step 946 second rotor actuators may optionally move a second swashplate coupled to second rotor actuators. In optional step 918, signals are transmitted from second rotor actuators to the FCC. The signals in step 918 may be transmitted to the FCC via the first channel. Step 950 represents optional post-processing that the FCC may optionally engage after receiving the signals transmitted in step 918. Optional post-processing 950 may include the same or similar, or different, elements as optional post-processing step 930. Steps 948-950 may be performed sequentially to steps 940-946, or some or all of steps 948-950 may be performed at the same time as steps 940-946. Steps 940-950 may be performed sequentially to steps 920-930, or some or all of steps 940-950 may be performed at the same time as steps 920-930.

The method 900 representatively illustrated in FIG. 9 also begins at 910 with a step 960 representing optional pre-processing that the FCC or other electronics may engage (or be engaged in) preliminary to the transmitting of signals from the FCC to third rotor actuators via a second channel in step 962. Optional pre-processing 960 may include the same or similar, or different, elements as optional pre-processing steps 920 or 940. After any optional pre-processing of step 960, signals are transmitted from the FCC to third rotor actuators via the second channel in step 962. The signals are received at third rotor actuators in step 964. In response to receiving the signals, in step 966 third rotor actuators may optionally move the first swashplate coupled to third rotor actuators and first rotor actuators. In optional step 968, signals are transmitted from third rotor actuators to the FCC. The signals in step 68 may be transmitted to the FCC via the second channel. Step 970 represents optional post-processing that the FCC may optionally engage after receiving the signals transmitted in step 968. Optional post-processing 970 may include the same or similar, or different, elements as optional post-processing steps 930 or 950. Steps 968-970 may be performed sequentially to steps 960-966, or some or all of steps 968-970 may be performed at the same time as steps 960-966. Steps 960-970 may be performed sequentially to steps 920-930 or steps 940-950, or some or all of steps 960-970 may be performed at the same time as steps 920-930 or 940-950.

Representative embodiments of the present disclosure may provide one or more technical advantages. Embodiments of an ACS such as those described herein can reduce the number of actuators on a given rotor system that are affected by certain failures, or convert or otherwise modify transients that would otherwise present as multi-actuator transients due to system failure(s) as transients which are more benign in their effect on the aircraft. A technical advantage of one or more embodiments of representative actuator control systems described herein may include a capability to improve pilot control of a rotorcraft and reduce pilot workload for recovery during and after channel failure(s). Additionally, with fewer actuators potentially being affected by a channel failure, a larger transient appearing on a single actuator may be allowed, and the stress on each operational actuator during a channel failure may be lessened. Thus, representative actuator control systems described herein may allow smaller or less powerful actuators to be used, which may decrease the weight, size, or cost of the actuators, or associated hydraulics used on the rotorcraft. In some cases, smaller actuators may require less maintenance. By separating actuation channels, representative actuator control systems described herein can also provide increased rotorcraft robustness to wiring failure(s) or electronics failure(s).

While this invention has been described with reference to illustrative embodiments, this description is not intended to be construed in a limiting sense. For example, while the systems and methods described above are directed toward a tiltrotor aircraft, the systems and methods can similarly be applied to other aircraft, such as fixed-wing aircraft, rotorcraft having coaxial rotors, rotorcraft having tandem rotors, rotorcraft having more than two rotors, unmanned aircraft, or others. For example, in a fixed-wing aircraft, actuators of control surfaces of each aircraft wing may be distributed between multiple channels as described herein. As another example, the actuators of each control surface of a V-tail may be distributed between channels in a similar manner. Various systems and methods can also be applied to other technologies that utilize multiple actuator systems, such as aerospace, robotics, automotive, etc. Representative actuator control systems described herein may be used in full-authority FBW aircraft, or in partial-authority FBW aircraft.

Various modifications and combinations of representative embodiments, as well as other embodiments of the invention, will be apparent to persons skilled in the art upon reference to the description. It is therefore intended that the appended claims encompass any such modifications or embodiments.

As used herein, the terms "comprises," "comprising," "includes," "including," "has," "having," or any contextual variant thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

As used herein, the terms "measure," "measuring," "measurement," "determining," "determination," "detecting," "detection," "detector," "sensing," "sensor," or contextual variants thereof, refer to functions or device components that assign or otherwise provide an output value for at least one of a direct measurement, an in-direct measurement, or a computed measurement. For example, a determination or detection of an angle between two lines may comprise a direct measurement of the angle between the lines, an indirect measurement of the angle (e.g., as in the case of extending the length of two non-parallel lines outside the area of observation so as to predict their angle of intersection), or a computed measurement (e.g., using trigonometric functions to calculate an angle). Accordingly, "determining" the angle of intersection may be regarded as equivalent to "detecting" the angle of intersection, and a "detector" for determining the angle may be regarded as directly measuring, indirectly measuring, or computing the angle between the lines.

Representative embodiments of the disclosure may be implemented in a computer communicatively coupled to a network. The network may include, for example, a public network, a private network, the Internet, an intranet, an internet, a wide area network (WAN), a local area network (LAN), a storage area network (SAN), a personal area network (PAN), a metropolitan area network (MAN), a satellite network, a public switched telephone network (PSTN), a cellular network, an optical network, a local network, a regional network, a global network, a wireless network, a wireline network, another computer, a standalone computer, or the like. As is known to those skilled in the art, a computer may include a central processing unit ("CPU") or processor, at least one read-only memory ("ROM"), at least one random access memory ("RAM"), at least one hard disc drive ("HDD"), and one or more input/output ("I/O") devices. I/O devices may include a keyboard, monitor, printer, electronic pointing device (e.g., mouse, trackball, stylus, etc.), or the like. In various embodiments, a server computer may have access to at least one database over a network. The database may be local or remote to a server computer.

Additionally, representative functions may be implemented on one computer or shared, or otherwise distributed, among two or more computers in or across a network. Communications between computers may be accomplished using any electronic signals, optical signals, radio frequency signals, or other suitable methods or tools of communication in compliance with network protocols now known or otherwise hereafter derived. It will be understood for purposes of this disclosure that various flight control embodiments may comprise one or more computer processes, computing devices, or both, configured to perform one or more functions. One or more interfaces may be presented that can be utilized to access these functions. Such interfaces include application programming interfaces (APIs), interfaces presented for remote procedure calls, remote method invocation, or the like.

Any suitable programming language(s) can be used to implement the routines, methods, programs, or instructions of embodiments described herein, including; e.g., C, C #, C++, Java, Ruby, MATLAB, Simulink, assembly language, or the like. Different programming techniques may be employed, such as procedural or object oriented ontologies. Any particular routine can execute on a single computer processing device or multiple computer processing devices, a single computer processor, or multiple computer processors. Data may be stored in a single storage medium or distributed across multiple storage mediums, and may reside in a single database or multiple databases (or other data storage techniques).

Although steps, operations, or computations may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process, such as an operating system, kernel, daemon, or the like. The routines can operate in an operating system environment or as stand-alone routines. Functions, routines, methods, steps, or operations described herein can be performed in hardware, software, firmware, or any combination thereof.

Embodiments described herein may be implemented in the form of control logic in software or hardware, or a combination of both. Control logic may be stored in an information storage medium, such as a computer-readable medium, as a plurality of instructions adapted to direct an information processing device to perform a set of steps disclosed in various embodiments. Based on the disclosure and teachings provided herein, a person of ordinary skill in the art will appreciate other ways or methods to implement similar, or substantially similar, functionality.

It is also within the spirit and scope herein to implement, in software, programming, or other steps, operations, methods, routines, or portions thereof described herein, where such software programming or code can be stored in a computer-readable medium and can be operated on by a processor to permit a computer to perform any of the steps, operations, methods, routines, or portions thereof described herein. Embodiments may be implemented using software programming or code in one or more general purpose digital computers, by using, e.g., application specific integrated circuits (ASICs), programmable logic devices, field programmable gate arrays (FPGAs), or optical, quantum, or nano-engineered systems, components, or mechanisms. In general, functions disclosed herein may be achieved by any means, whether now known or hereafter derived in the art. For example, distributed or networked systems, components, or circuits can be used. In another example, communication or transfer (or otherwise moving from one place to another) of data may be wired, wireless, or accomplished by any other means.

A "computer-readable medium" may be any medium that can contain, store, communicate, propagate, or transport a program for use by or in connection with the instruction execution system, apparatus, system, or device. The computer-readable medium can be, but is not limited to, an electronic, magnetic, optical, electromagnetic, infrared, or semiconductor system, apparatus, system, device, propagation medium, or computer memory. Such computer-readable medium will generally be machine readable and include software programming or code susceptible to being human readable (e.g., source code) or machine readable (e.g., object code).

A "processor" includes any hardware system, mechanism or component that processes data, signals, or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," or the like. Portions of processing may be performed at different (or same) times and at different (or same) locations by different (or same) processing systems.

It will also be appreciated that one or more elements depicted in the Figures may also be implemented in a more-separated or more-integrated manner, or even removed or rendered inoperable in certain cases, as may be useful in accordance with particular applications and embodiments. Additionally, any signal lines or arrows in the Figures should be considered only as representative, and therefore not limiting, unless otherwise specifically noted.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "etc., "or the like," "in a representative embodiment," "in one embodiment," "in another embodiment," or "in some embodiments." Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially the same result in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:

1. A rotorcraft, comprising:
    a flight control computer (FCC);
    a first rotor system comprising:
        a first swashplate coupled to a first rotor; and
        a first plurality of actuators configured to operate simultaneously to move the first swashplate;
    a second rotor system comprising:
        a second swashplate coupled to a second rotor; and
        a second plurality of actuators configured to operate simultaneously to move the second swashplate;
    a first communications channel coupled between the FCC, a first actuator of the first plurality of actuators, and a second actuator of the second plurality of actuators; and
    a second communications channel coupled between the FCC and a third actuator of the first plurality of actuators, wherein each actuator of the first plurality of actuators and each actuator of the second plurality of actuators is exclusively coupled to either the first communications channel or the second communications channel.

2. The rotorcraft of claim 1, wherein the first rotor system and the second rotor system comprise a tilt rotor system of a tilt rotorcraft.

3. The rotorcraft of claim 2, wherein the tilt rotorcraft further comprises a wing, and wherein the first rotor system is disposed at a first end of the wing and the second rotor system is disposed at a second end of the wing opposite the first end.

4. The rotorcraft of claim 1, wherein the second communications channel is coupled between the FCC and a fourth actuator of the second plurality of actuators.

5. The rotorcraft of claim 1, wherein the first communications channel is configured to transmit control signals from the FCC to the first actuator and the second actuator.

6. The rotorcraft of claim 1, wherein the first actuator comprises a first position sensor and the second actuator comprises a second position sensor, and wherein the first communications channel is configured to transmit sensor feedback signals to the FCC from the first position sensor and the second position sensor.

7. The rotorcraft of claim 1, wherein the first plurality of actuators comprises at least one actuator configured to control cyclic motion of the first rotor, and at least one actuator configured to control collective motion of the first rotor.

8. An actuator control system (ACS) for a rotorcraft, the ACS comprising:
    a first set of wiring configured to communicate signals between a flight control computer (FCC), a first plurality of actuators, and a second plurality of actuators, wherein at least one of the first plurality of actuators is part of a first rotor system, and at least one of the second plurality of actuators is part of a second rotor system, the second rotor system different than the first rotor system; and
    a second set of wiring configured to communicate signals between the FCC, a third plurality of actuators, and a fourth plurality of actuators, wherein at least one of the third plurality of actuators is part of the first rotor system, and at least one of the fourth plurality of actuators is part of the second rotor system, wherein the second set of wiring is not connected to the first plurality of actuators or to the second plurality of actuators, wherein the first set of wiring is not connected to the third plurality of actuators or to the fourth plurality of actuators, wherein the first set of wiring and the second set of wiring are configured to communicate signals simultaneously.

9. The ACS of claim 8, further comprising a third set of wiring configured to communicate signals between the FCC, a fifth plurality of actuators, and a sixth plurality of actuators, wherein the fifth plurality of actuators are part of the first rotor system and the sixth plurality of actuators are part of the second rotor system, wherein the fifth plurality of actuators are different than the sixth plurality of actuators.

10. The ACS of claim 8, wherein the first plurality of actuators are configured to move a first swashplate of the rotorcraft, wherein the first swashplate is part of the first rotor system.

11. The ACS of claim 8, wherein the first set of wiring is configured to be deactivated independently from the second set of wiring.

12. The ACS of claim 8, wherein the first plurality of actuators comprises two actuators.

13. The ACS of claim 8, wherein the FCC is configured to communicate first signals having a first polarity to a first actuator of the first plurality of actuators and second signals having a second polarity to a second actuator of the first plurality of actuators, wherein the second polarity is different from the first polarity.

14. A method, comprising:
    transmitting signals from a first flight control computer (FCC) to one or more first rotor actuators, the one or more first rotor actuators coupled to a first rotor system via a first channel, the first channel communicatively coupled between the first FCC and the one or more first rotor actuators;
    transmitting signals from the first FCC to one or more second rotor actuators, the one or more second rotor actuators coupled to a second rotor system via the first channel, the first channel communicatively coupled between the FCC and the one or more second rotor actuators; and
    transmitting signals from the first FCC to one or more third rotor actuators, the one or more third rotor actuators coupled to the first rotor system via a second channel, the second channel communicatively coupled between the first FCC and the one or more third rotor actuators, wherein the rotor actuators of the one or more third rotor actuators are different rotor actuators than any of the rotor actuators of the one or more first rotor actuators, wherein the transmitting of the signals from the first FCC to the one or more third rotor actuators is concurrent with the transmitting of the signals from the first FCC to the one or more first rotor actuators.

15. The method of claim 14, further comprising transmitting signals from the first FCC to one or more fourth rotor actuators, the one or more fourth rotor actuators coupled to the second rotor system via the second channel, the one or more fourth rotor actuators being different than the one or more second rotor actuators.

16. The method of claim 15, wherein transmitting signals from the FCC to the one or more first rotor actuators comprises sending actuator control signals from the FCC to the one or more first rotor actuators.

17. The method of claim 16, further comprising:
receiving the actuator control signals at the one or more first rotor actuators; and
moving a swashplate of the first rotor system using the one or more first rotor actuators, in response to receiving the actuator control signals.

18. The method of claim 14, wherein the first rotor system is a main rotor of a helicopter, and the second rotor system is a tail rotor of the helicopter.

19. The method of claim 14, further comprising transmitting signals from the one or more first rotor actuators to the first FCC via the first channel.

20. The method of claim 14, further comprising transmitting signals from a second flight control computer (FCC) to the one or more first rotor actuators, the first channel communicatively coupled between the second FCC and the one or more first rotor actuators.

* * * * *